3,274,236
HALO-SUBSTITUTED CARBOXYLIC ACID
ESTERS OF NITRO ALKANOLS
Louis Schmerling, Riverside, Ill., assignor to Universal Oil Products Company, Des Plaines, Ill., a corporation of Delaware
No Drawing. Filed Mar. 12, 1965, Ser. No. 439,451
6 Claims. (Cl. 260—487)

This application is a continuation-in-part of my copending application Serial No. 245,672 which was filed December 19, 1962, now abandoned.

This invention relates to new compositions of matter comprising esters which are formed by the reaction of halo-substituted carboxylic acids with nitro alkanols. More particularly, the invention is concerned with new compositions of matter comprising halo-substituted carboxylic acid esters of lower nitro alkanols and to a method for the preparation thereof, said compounds possessing insecticidal activity.

It is known in the prior art that certain esters of aromatic alcohols can be utilized as nematocide compositions of matter, nematodes being non-segmented worms which are found in the soil, plant life or in animal life. However, it is stated in the prior art that the substitution of a nitro group in the para-position of the aromatic ring of such an ester decreases the activity of the compound in its chosen utility. Other prior art discloses esters of nitro alkanols in which the acid portion is an alkanedioic or alkanetrioic acid.

In contradistinction to the compounds known and in the prior art, it has now been discovered that new compositions of matter comprising esters which are formed by the reaction of a nitro alkanol and a halo-substituted saturated aliphatic carboxylic acid, particularly those which contain polyhalo (especially polychloro) substituents, will possess insecticidal properties and therefore may be useful as insecticides. In addition, if so desired, the novel compositions of matter of the present invention may also be used as intermediates in the preparation of other organic compounds such as resins, pharmaceuticals, plastics, etc. For example, the ester formed by the reaction of 2 molecular proportions of trichloroacetic acid with 1 molecular proportion of 2-nitro-2-methyl-1,3-propanediol, namely, 1,3-bis(trichloroacetoxy)-2-nitro-2-methylpropane will be an effective insecticide, especially against houseflies. This activity is totally unexpected inasmuch as it has been known that substituted alkyl esters of halocarboxylic acids are not particularly active insecticides. Therefore, in view of the prior art which, as hereinbefore set forth, has stated that the substitution of a nitro group in the aromatic ester will decrease the activity of the compound as a nematocide it was unexpected that introduction of a nitro group into an alkyl ester of a halocarboxylic acid would yield a product which possesses insecticidal activity of the type found in the products of the present invention.

It is therefore an object of this invention to prepare novel compositions of matter which, in view of the known art, possess unexpected insecticidal activity.

A further object of this invention is to prepare novel compositions of matter which possess useful insecticidal activity by condensing a halo-substituted carboxylic acid with a lower nitro alkanol under condensation conditions.

In a broad aspect, one embodiment of this invention resides in a substituted saturated aliphatic carboxylic acid ester of a nitro alkanol in which the only substituent is a halogen selected from the group consisting of fluorine, chlorine and bromine.

A further embodiment of this invention is found in a substituted saturated aliphatic carboxylic acid ester of a nitro alkanol in which the only substituent is a halogen selected from the group consisting of fluorine, chlorine and bromine, said acid containing from 2 to about 18 carbon atoms and said alkanol containing from 1 to about 12 carbon atoms.

A specific embodiment of this invention is found in a halo-substituted propionic acid ester of a lower nitro alkanol in which the halogen is selected from the group consisting of fluorine, chlorine and bromine.

A more specific embodiment of this invention is found in 1-(2,2-dichloropropionoxy)-2-nitropropane.

Other objects and embodiments will be found in the following further detailed description of this invention.

As hereinbefore set forth, it has now been discovered that novel compositions of matter which possess unexpected insecticidal activity may be prepared by condensing halo-substituted carboxylic acids with nitro alkanols under acidic conditions to prepare halo-substituted carboxylic acid esters of nitro alkanols. Suitable halogenated carboxylic acids will include both mono- and polyhalo acids; the terms "halogenated" or "halo-substituted" carboxylic acids as used in the present specification and appended claims will refer to both mono- and polyhalo substituted saturated aliphatic carboxylic acids. Of the halogen substituents the preferred halogens comprise those having an atomic weight of between 19 and 80 (i.e., fluorine, chlorine and bromine) although it is contemplated within the scope of this invention that iodine-containing carboxylic acids may be used, although not necessarily with equivalent results. Examples of halogenated carboxylic acids which may be used include those acids containing from 2 to about 18 carbon atoms or more such as fluoroacetic acid, difluoroacetic acid, trifluoroacetic acid, chloroacetic acid, dichloroacetic acid, trichloroacetic acid, bromoacetic acid, dibromoacetic acid, tribromoacetic acid, 2-fluoropropionic acid, 3-fluoropropionic acid, 2,2-difluoropropionic acid, 2,2,3-trifluoropropionic acid, 2,2,3,3-tetrafluoropropionic acid, pentafluoropropionic acid, 2-chloropropionic acid, 3-chloropropionic acid, 2,2,-dichloropropionic acid, 3,3-dichloropropionic acid, 2,2,3-trichloropropionic acid, 3,3,3-trichloropropionic acid, 2,2,3,3-tetrachloropropionic acid, pentachloropropionic acid, 2-bromopropionic acid, 2,2-dibromopropionic acid, 2,2,3-tribromopropionic acid, 2,2,3,3-tetrabromopropionic acid, pentabromopropionic acid, 2-fluorobutyric acid, 2,2-difluorobutyric acid, 2,2,3-trifluorobutyric acid, 2,2,3,3-tetrafluorobutyric acid, 2,2,3,3,4-pentafluorobutyric acid, hexafluorobutyric acid, perfluorobutyric acid, 2-chlorobutyric acid, 2,2-dichlorobutyric acid, 2,2,3-trichlorobutyric acid, 2,2,3,3-tetrachlorobutyric acid, 2,2,3,3,4-pentachlorobutyric acid, hexachlorobutyric acid, perchlorobutyric acid, 2-bromobutyric acid, 2,2-dibromobutyric acid, 2,2,3-tribromobutyric acid, 2,2,3,3-tetrabromobutyric acid, 2,2,3,3,4-pentabromobutyric acid, hexabromobutyric acid, perbromobutyric acid, the mono- and poly- fluoro-, chloro- and bromo-isobutyric acids, valeric acids, caproic acids, oenanthylic acids, caprylic acids, pelargonic acids, capric acids, undecyclic acids, lauric acids, tridecylic acids, myristic acids, pentadecylic acids, palmitic acids, heptadecylic acids, stearic acids, etc. The preferred halo-substituted acids are those acids which contain at least one halogen atom on an alpha carbon atom.

Suitable nitro alkanols which may be condensed with the aforementioned acids include those alkanols containing from 1 to about 12 carbon atoms in the chain and which also contain 1 or more hydroxy groups in addition to the nitro substituent. Examples of these compounds which may be used include 2-nitroethanol, 2- and 3-nitropropanol, 2-nitro-1,3-propanediol, 2-nitro-2-methylpropanol, 2-nitro-2-methyl-1,3-propanediol, 1,1,1-tris(hydroxymethyl)-nitromethane, 2-nitro-1-butanol, 3-nitro-1-butanol, 2-nitro-2-methyl-1,4-butanediol, 2-nitro-1,3,4- butanetriol, 2-nitro-2-methylbutanol, 2-nitro-2-ethyl-1,4-butanediol, 2,2,2-tris(hydroxymethyl)-1-nitroethanol, 1-nitro-2-pentanol, 3-nitro-2-pentanol, 5-nitro-2-pentanol, 2-nitro-1-pentanol, 3-nitro-1-pentanol, 4-nitro-1-pentanol, 5-nitro-1-pentanol, 2-nitro-1,5-dipentanediol, 2-nitro-1,3-pentanediol, 2 - nitro-1-methyl-1-pentanol, 2 - nitro-1-methyl-1,5-pentanediol, the isomeric nitrohexanols, nitrohexanediols, nitroheptanols, nitroheptanediols, nitrooctanols, nitrooctanediols, nitrononanols, nitrononanediols, nitrodecanols, nitrodecanediols, nitroundecanols, nitroundecanediols, nitrododecanols, nitrododecanediols, etc. It is contemplated within the scope of this invention that the aforementioned isomeric compounds may also contain more than two hydroxy groups and thus be classified as triols, tetraols, etc. While it is usually preferred that the hydroxyl groups be on non-adjacent carbon atoms in the polyols, compounds in which the hydroxy groups are on adjacent carbon atoms may be used, if desired. Further, not only aliphatic alcohols but also analogous cyclic compounds such as 4-nitro-1-cyclohexanol and 5-nitro-1,3-cyclohexanediol are included in the term "nitro alkanol." It is to be understood that the aforementioned halogen-substituted carboxylic acids and nitro alkanols are only representatives of the class of compounds which may be used and that the present invention is not necessarily limited thereto.

The condensation between the nitro alkanol and the halo-substituted carboxylic acid is preferably effected under acidic conditions. It is contemplated within the scope of this invention that the halo-substituted carboxylic acid may be of sufficient strength to provide the necessary acidic conditions. However, when relatively weak acids are used, it will be necessary to provide an outside source of acidic material and, therefore, catalytic amounts of acids including inorganic acids such as sulfuric acid, phosphoric acid, etc., or organic acids such as benzenesulfonic acid, toluenesulfonic acids, p-toluenesulfonic acid monohydrate, etc., may be used. The product which is obtained by the condensation between the halo-substituted carboxylic acid and the nitro alkanol will be determined to a large extent upon the amount of halo-substituted carboxylic acid present in the reaction mixture and upon whether the nitro alkanol contains 1, 2, 3 or more hydroxy groups. For example, when a halo-substituted carboxylic acid such as trichloroacetic acid is reacted with a trihydroxy nitro compound, the reaction product will contain up to 3 (i.e., 1, 2, or 3) carboxylic acid moieties on the ester depending upon how great an excess of the acid is present in the reaction mixture. It might be mentioned at this point that the term "nitro alkanol" as used in the present specification and appended claims will refer to mono- and polyalkanols such as nitro alkanols, nitro alkanediols, nitro alkanetriols, nitro alkanetetraols, etc. Therefore, it might be said that the amount of halo-substituted carboxylic acid used in the reaction mixture lies within a mole ratio of 1:1 to 4:1 moles of acid or even more per mole of nitro alkanol.

The reaction is usually effected in the presence of an inert organic solvent or diluent, said solvents including alkanes such as n-pentane, n-hexane, n-heptane, etc.; cycloalkanes such as cyclopentane, methylcyclopentane, cyclohexane, etc.; aromatic hydrocarbons such as benzene, toluene, o-xylene, m-xylene, p-xylene, ethylbenzene, etc. When utilizing a solvent of the type hereinbefore set forth, the condensation is then effected at temperatures approximately at refluxed temperature of the solvent. For example, when benzene is used, the reaction will usually be effected at a temperature of about 80°–85° C., the use of toluene as a solvent will call for reaction temperatures in a range of from about 110°–115° C. while the use of the xylenes will result in a reaction temperature of about 135°–145° C. Generally speaking, the reaction may be said to occur within a temperature range of from about 50° to about 200° C. or more. In addition, the reaction is usually effected at atmospheric pressure. However, if higher temperatures are desired, the reaction may also be effected at superatmospheric pressures ranging from about 2 to about 50 atmospheres or more, the amount of pressure being that which is necessary to maintain a major portion of the reactants in the liquid phase. If so desired, the superatmospheric pressures may be obtained by charging an inert gas such as nitrogen to the reaction zone until the desired pressure has been reached.

The process of the present invention may be effected in any suitable manner and may comprise either a batch or continuous type operation. For example, when a batch type operation is used, a quantity of the starting materials, namely, the halo-substituted carboxylic acid and the nitro alkanol along with a particular solvent and the catalytic amount of acid catalyst, if required, is placed in an appropriate condensation apparatus containing heating, mixing and reflux means. In addition, the apparatus may also be provided with means which permit removal of the water which is formed during the reaction. The reaction vessel is heated to the desired temperature, refluxed and maintained for a predetermined period of time. At the end of the residence time which may be from about 0.5 to about 12 hours or more, the reaction vessel and the contents thereof are allowed to cool to room temperature and the reaction product is separated and unreacted starting materials, unwanted side products and solvents by conventional means such as fractional distillation, crystallization, etc. The reaction product is then purified by recrystallization and recovered.

It is also contemplated within the scope of this invention that the desired halo-substituted carboxylic acid ester of a nitro alkanol may be prepared by a continuous process wherein the material is continuously charged to a reaction vessel which is maintained at the proper operating conditions of temperature and pressure. After a desired residence time in the reactor, a product stream is continuously withdrawn therefrom. The condensation product is separated from any unreacted starting materials and/or unwanted side reaction products which may have formed and purified by conventional means as hereinbefore set forth while unreacted starting materials are recycled for further use as a portion of the feed material.

The physical properties of the present halo-substituted saturated aliphatic carboxylic acid esters of nitro alkanols and the effects they have on entomological forms of life make them particularly desirable as insecticides and insect repellants, the compounds having many of the features desired of materials for this purpose. They are, for example, toxic to insects which are destructive of plant life and property normally subject to insect infestation, their toxic effects being manifested by contact of the poison with the insect. The insecticides comprising the present compounds are thus effective against chewing as well as sucking types of insects. The compounds are sufficiently volatile such that when applied to plant life intended for subsequent human consumption the plant when harvested and after allowing a reasonable time for evaporation of the applied insecticide therefrom retain none of the toxicant to prevent use of the plant for food purposes. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high-boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water or combined with an oil and emulsified with water by the addition of an emulsifying agent, such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred in some instances where deep penetration of the insecticide is desired, as in the treatment of fibrous material, such as wood for extinction of a particular infestation, such as wood termites. For other purposes, the required concentration of active components in the formulation may be as low as 0.1% as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as butane, Freon, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as, kerosene, an alcohol, etc., and the resulting solution atomized by a suitable spraying device.

Examples of novel compositions of matter which comprise the present invention and which, as hereinbefore set forth, possess unexpected insecticidal activities comprise halo-substituted saturated aliphatic carboxylic acid esters of nitro alkanols such as 1-fluoroacetoxy-2-nitroethane,
1-difluoroacetoxy-2-nitroethane,
1-trifluoroacetoxy-2-nitroethane,
1-chloroacetoxy-2-nitroethane,
1-dichloroacetoxy-2-nitroethane,
1-trichloroacetoxy-2-nitroethane,
1-bromoacetoxy-2-nitroethane,
1-dibromoacetoxy-2-nitroethane,
1-tribromoacetoxy-2-nitroethane,
1-(2-fluoropropionoxy)2-nitroethane,
1-(2-fluoropropionoxy)-2-nitroethane,
1-(2,2-difluoropropionoxy)-2-nitroethane,
1-(2,2,3-trifluoropropionoxy-2-nitroethane,
1-(2-chloropropionoxy)-2-nitroethane,
1-(2,2-dichloropropionoxy)-2-nitroethane,
1-(2,2,3-trichloropropionoxy)-2-nitroethane,
1-(3,3,3-trichloropropionoxy)-2-nitroethane,
1-(2,2,3,3-tetrachloropropionoxy)-2-nitroethane,
1-(pentachloropropionoxy)-2-nitroethane,
1-(2-bromopropionoxy)-2-nitroethane,
1-(2,2-dibromopropionoxy)-2-nitroethane,
1-(2,2,3-tribromopropionoxy)-2-nitroethane,
1-(2,3,3,3-tetrabromopropionoxy)-2-nitroethane,
1-(pentabromopropionoxy)-2-nitroethane,
1-fluoroacetoxy-2-nitropropane,
1-difluoroacetoxy-2-nitropropane,
1-trifluoroacetoxy-2-nitropropane,
1-chloroacetoxy-2-nitropropane,
1-dichloroacetoxy-2-nitropropane,
1-trichloroacetoxy-2-nitropropane,
1-bromoacetoxy-2-nitropropane,
1-dibromoacetoxy-2-nitropropane,
1-tribromoacetoxy-2-nitropropane,
1-(2-fluoropropionoxy)-2-nitropropane,
1-(2,2-difluoropropionoxy)-2-nitropropane,
1-(2-chloropropionoxy)-2-nitropropane,
1-(3-chloropropinoxy)-2-nitropropane,
1-(2,2-dichloropropionoxy)-2-nitropropane,
1-(2,2,3-trichloropropionoxy)-2-nitropropane,
1-(2,2,3,3-tetrachloropropionoxy)-2-nitropropane,
1-(pentachloropropionoxy)-2-nitropropane,
1-(2-bromopropionoxy)-2-nitropropane,
1-(2,2-dibromopropionoxy)-2-nitropropane,
1-(2,2,3-tribromopropionoxy)-2-nitropropane,
1-(2,3,3,3-tetrachloropropionoxy)-2-nitropropane,
1-(pentabromopropionoxy)-2-nitropropane,
1-fluoroacetoxy-2-nitro-2-methylpropane,
1-difluoroacetoxy-2-nitro-2-methylpropane,
1-(2,2,3-trifluoropropionoxy)-2-nitropropane,
1-(pentafluoropropionoxy)-2-nitropropane,
1-chloroacetoxy-2-nitro-2-methylpropane,
1-dichloroaectoxy-2-nitro-2-methylpropane,
1-trichloroacetoxy-2-nitro-2-methylpropane,
1-bromoacetoxy-2-nitro-2-methylpropane,
1-dibromoacetoxy-2-nitro-2-methylpropane,
1-tribromoacetoxy-2-nitro-2-methylpropane,
1-(2-fluoropropionoxy)-2-nitro-2-methylpropane,
1-(2,2-difluoropropionoxy)-2-nitro-2-methylpropane,
1-(2,2,3-trifluoropropionoxy)-2-nitro-2-methylpropane,
1-(pentafluoropropionoxy)-2-nitro-2-methylpropane,
1-(2-chloropropionoxy)-2-nitro-2-methylpropane,
1-(2,2-dichloropropionoxy)-2-nitro-2-methylpropane,
1-(2,2,3-trichloropropionoxy)-2-nitro-2-methylpropane,
1-(pentachloropropionoxy)-2-nitro-2-methylpropane,
1-(2-bromopropionoxy)-2-nitro-2-methylpropane,
1-(2,2-dibromopropionoxy)-2-nitro-2-methylpropane,
1-(2,2,3-tribromopropionoxy)-2-nitro-2-methylpropane,
1-(pentabromopropionoxy)-2-nitro-2-methylpropane,
1,3-bis(fluoroacetoxy)-2-nitro-2-methylpropane,
1,3-bis(difluoroacetoxy)-2-nitro-2-methylpropane,
1,3-bis(trifluoroacetoxy)-2-nitro-2-methylpropane,
1,3-bis(chloroacetoxy)-2-nitro-2-methylpropane,
1,3-bis(dichloroacetoxy)-2-nitro-2-methylpropane,
1,3-bis(trichloroacetoxy)-2-nitro-2-methylpropane,
1,3-bis(bromoacetoxy)-2-nitro-2-methylpropane,
1,3-bis(dibromoacetoxy)-2-nitro-2-methylpropane,
1,3-bis(tribromoacetoxy)-2-nitro-2-methylpropane,
1,3-bis(fluoropropionoxy)-2-nitro-2-methylpropane,
1,3-bis(2,2-difluoropropionoxy)-2-nitro-2-methylpropane,
1,3-bis(2,2,3-trifluoropropionoxy)-2-nitro-2-methylpropane,
1,3-bis(2-chloropropionoxy)-2-nitro-2-methylpropane,
1,3-bis(2,2,-dichloropropionoxy)-2-nitro-2-methylpropane,
1,3-bis(2,2,3-trichloropropionoxy)-2-nitro-2-methylpropane,
1,3-bis(2-bromopropionoxy)-2-nitro-2-methylpropane,
1,3-bis(2,2-dibromopropionoxy)-2-nitro-2-methylpropane,
1,3-bis(2,2,3-tribromopropionoxy)-2-nitro-2-methylpropane,
tris(trichloroacetoxymethyl)nitromethane,
etc.

It is to be understood that the aforementioned compounds are only representative of the type of compounds which may be prepared and that the present invention is not necessarily limited thereto.

The following examples are given to illustrate the process of the present invention which, however, are not intended to limit the generally broad scope of the present invention in strict accordance therewith.

*Example I*

A solution of 23.8 grams of 2-nitro-2-methylpropanol and 32.6 grams of trichchloroacetic acid in 77.6 grams of toluene was heated along with a catalytic amount comprising 2.0 grams of p-toluenesulfonic acid monohydrate under reflux in a flask equipped with a Dean-Stark trap which permitted removal of the water formed during the reaction. The temperature was maintained in a range of from about 113° to 125° C. for a period of about 4.5 hours. During this time about 3.4 cc. of water was removed. Following this the flask and contents thereof were allowed to cool to room temperature. During this time a small amount of yellow crystals formed in the dark brown liquid. The product was filtered to remove 0.7 gram of these light yellow needles which had a melting point of about 240° to 270° C. The dark brown filtrate was concentrated in a steam bath almost to dryness until crystallization occurred. Recrystallization of the crystals was effected from a hot dilute methyl alcohol solution and yielded 24.2 grams of off-white needles which had a melting point of 64°–66° C.

The crystals which were 1-trichloroacetoxy-2-nitro-2-methylpropane, were analyzed with the following results:

Calculated for $(CH_3)_2C(NO_2)CH_2OOCCCl_3$: Cl, 40.22; N, 5.29. Found: Cl, 40.0; N, 5.27.

*Example II*

A solution of 27.0 grams of 2-nitro-2-methyl-1,3-propanediol and 65.4 grams of trichloroacetic acid and 108 grams of toluene along with 3.0 grams of p-toluenesulfonic acid monohydrate was refluxed at a temperature in the range of from about 105° to 119° C. for a period of about 3.5 hours. During this time 6 cc. of water was removed by means of a Dean-Stark trap attached to the flask.

The flask and contents thereof were then cooled to a temperature of about 0° C. and the product was filtered, the filtrate was concentrated and cooled yielding 6.2 grams of white needles which were recrystallized from aqueous ethyl alcohol solution, said crystals comprising 1,3-bis-(trichloroacetoxy)-2-nitro-2-methylpropane having a melting point of 67°–68° C.

The crystals were analyzed with the following results:
Calculated for $(Cl_3CCOOCH_2)_2C(NO_2)CH_3$; Cl, 49.96. Found: Cl, 49.4.

*Example III*

To a flask provided with a Dean-Stark trap which permitted removal of water formed during the reaction there was added a solution of 30 grams of 2-nitro-2-ethyl-1,3-propanediol, 65 grams of trichloroacetic acid, 88 grams of toluene and 2 grams of p-toluenesulfonic acid monohydrate. The flask was heated and maintained at a temperature in the range of from about 113°–120° C. for a period of about 4.5 hours. During this time 6 cc. of water was removed. At the end of this residence time the flask and contents thereof were cooled to a temperature of about 0° C. and the reaction product then filtered. The filtrate was evaporated to a solid mass which was recrystallized from dilute methyl alcohol. There was obtained 29 grams of golden tan crystals which had a melting point of 54°–55° C. The crystals comprising 1,3-bis(trichloroacetoxy) - 2 - ethyl-2-nitropropane, were analyzed with the following results:

Calculated for $(Cl_3CCOOCH_2)_2C(NO_2)C_2H_5$; Cl, 48.36; N, 3.18. Found: Cl, 46.6; N, 3.00.

*Example IV*

A solution of 30 grams (0.2 mole) of 1,1,1-tris(hydroxymethyl)nitromethane and a molar excess comprising 98 grams (0.6 mole) of trichloroacetic acid along with 170 grams of toluene and 2 grams of p-toluenesulfonic acid monohydrate was placed in a flask provided with a Dean-Stark trap for removal of water formed during the reaction. The flask was maintained at a temperature in the range of from about 118° to 122° C. for a period of about 8.5 hours. During this time 9.5 grams of water was recovered. The product was treated with pentane, filtered and the filtrate was concentrated until it was solid when cooled. The solid was then heated with a 2:1 mixture of toluene and benzene which dissolved all but 6 grams of tan crystals. The tan crystals were recovered and found to have a melting point of 185°–190° C. On cooling the solution deposited 18.5 grams of light tan needle-like crystals having a melting point of 73°–76° C. The mother liquor was then concentrated to yield 27 grams of dark crystals having a melting point of 50°–55° C. The dark crystals were then recrystallized from a dilute methyl alcohol solution to give 2 grams of white crystals melting at 63°–70° C. These crystals were then analyzed with the following results which show that they were chiefly (trichloroacetoxymethyl)bis(hydroxymethyl) nitromethane.

Calculated for $(HOCH_2)_2C(Cl_3CCOOCH_2)NO_2$; Cl, 35.88. Found: Cl, 32.8.

The mother liquor from the above crystallization was again concentrated to yield 2.7 grams of tan crystals having a melting point of 54°–57° C. These crystals were analyzed with the following results:

Found: Cl, 37.0.

*Example V*

In this example a solution of 22 grams of 2-nitropropanol, 36 grams of 2,2-dichloropropionic acid, 80 grams of toluene and 2 grams of p-toluenesulfonic acid monohydrate are placed in a flask provided with a Dean-Stark trap. The flask and contents thereof are then heated and maintained at a temperature in the range of from about 110°–125° C. for a period of about 4.5 hours. During this time the water formed by the reaction is collected in the trap. Upon completion of the residence time the flask and contents thereof are cooled to room temperature, and filtered. The filtrate is then concentrated in a steam bath until crystallization occurs. The crystals are recrystallized from a hot aqueous methyl alcohol solution to yield crystals comprising 1-(2,2-dichloropionoxy)-2-nitropropane.

*Example VI*

In this example a solution of 19 grams of 2-nitroethanol, 33 grams of trichloroacetic acid, 80 grams of toluene and 2.0 grams of p-toluenepropionic acid monohydrate is placed in a flask provided with a Dean-Stark trap and treated in a manner similar to that set forth in the above examples. Upon completion of the desired residence time the filtrate is recovered after cooling, concentrated and the crystals resulting therefrom are recrystallized from a dilute methyl alcohol solution. These crystals comprise 1-trichloroacetoxy-2-nitroethane.

*Example VII*

A solution of 27 grams of 2-nitro-2-methyl-1,3-propanediol, 46 grams of trifluoroacetic acid, 80 grams of toluene and 2.0 grams of p-toluenesulfonic acid monohydrate is treated in a manner similar to that set forth in the above examples. Upon completion of the desired residence time the reaction mixture is also treated in a manner similar to that hereinbefore set forth and the desired product comprising 1,3-bis(trifluoroacetoxy)-2-nitro-2-methylpropane is separated and recovered.

*Example VIII*

An insecticidal solution is prepared by dissolving 1 gram of 1-trichloroacetoxy-2-nitro-2-methylpropane in 2 cc. of benzene. The resulting solution is added to 100 cc. of water using 1 gram of Triton–X–100 as an emulsifying agent. This solution is sprayed into a cage containing houseflies and will cause a 100% knock-down. Similar insecticidal compositions which are prepared in a like manner utilizing the novel compositions of matter prepared according to Examples II–VII above will show similar results.

I claim as my invention:

1. An ester of a halo-substituted saturated aliphatic carboxylic acid containing from 2 to about 18 carbon atoms and in which the halogen is selected from the group consisting of fluorine, chlorine and bromine and a nitro polyalkanol containing from 2 to about 12 carbon atoms.

2. An ester of a halo-substituted saturated aliphatic carboxylic acid containing from 2 to about 18 carbon atoms and in which the halogen is selected from the group consisting of fluorine, chlorine and bromine and a nitro alkanediol containing from 2 to about 12 carbon atoms.

3. The ester of claim 2 further characterized in that said acid is selected from the group consisting of acetic and propionic acids.

4. 1,3-bis(trichloroacetoxy)-2-nitro-2-methylpropane.

5. 1,3-bis(trichloroacetoxy)-2-nitro-2-ethylpropane.

6. (Trichloroacetoxymethyl)bis(hydroxymethyl)nitromethane.

References Cited by the Examiner

UNITED STATES PATENTS

| | | | |
|---|---|---|---|
| 2,402,776 | 6/1946 | Robinette | 260—404 |
| 2,427,821 | 9/1947 | Tindall | 260—404 |

OTHER REFERENCES

Gertler et al., J. Agricultural and Food Chemistry, vol. 6, pp. 843–4 (1958).

King, Chemicals Evaluated as Insecticides and Repellants at Orlando, Fla., Agriculture Handbook No. 69, issued May 1954. Page 29 relied upon.

LORRAINE A. WEINBERGER, *Primary Examiner.*

A. P. HALLUIN, *Assistant Examiner.*